US010618670B2

(12) United States Patent
Porte et al.

(10) Patent No.: US 10,618,670 B2
(45) Date of Patent: Apr. 14, 2020

(54) AIRCRAFT PROPULSION SYSTEM HAVING AT LEAST ONE ANTI-FIRE TANK (71) Applicant: Airbus Operations SAS, Toulouse (FR)

(72) Inventors: Alain Porte, Colomiers (FR); Jean Michel Rogero, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 868 days.

(21) Appl. No.: 15/280,130

(22) Filed: Sep. 29, 2016

(65) Prior Publication Data
US 2017/0096238 A1 Apr. 6, 2017

(30) Foreign Application Priority Data

Oct. 2, 2015 (FR) ...................... 15 59380

(51) Int. Cl.
B64D 45/00 (2006.01)
B64C 7/02 (2006.01)
F02C 7/25 (2006.01)
B64D 27/18 (2006.01)
B64D 29/02 (2006.01)
F01D 19/00 (2006.01)
(Continued)

(52) U.S. Cl.
CPC ................ *B64D 45/00* (2013.01); *B64C 7/02* (2013.01); *B64D 27/18* (2013.01); *B64D 29/02* (2013.01); *F01D 19/00* (2013.01); *F01D 25/24* (2013.01); *F02C 7/25* (2013.01); *F02K 3/06* (2013.01); *B64D 2045/009* (2013.01); *F05D 2220/323* (2013.01); *F05D 2250/36* (2013.01); *F05D 2250/71* (2013.01); *Y02T 50/671* (2013.01)

(58) Field of Classification Search
CPC .. B64D 45/00; B64D 2045/009; B64D 27/18; B64D 29/02; B64D 33/00; B64C 7/02; F01D 19/00; F01D 25/24; F02C 7/25; F02K 3/06; F05D 2220/323; F05D 2250/36; F05D 2250/71; Y02T 50/671
USPC ....................................... 60/39.091
See application file for complete search history.

(56) References Cited

U.S. PATENT DOCUMENTS 2,952,125 A * 9/1960 Brunton .................... F02C 7/25
244/53 R

FOREIGN PATENT DOCUMENTS

FR 3015568 6/2015

OTHER PUBLICATIONS

French Search Report, dated Jul. 21, 2016, priority document.

* cited by examiner

*Primary Examiner* — Mark A Laurenzi
*Assistant Examiner* — Loren C Edwards
(74) *Attorney, Agent, or Firm* — Greer, Burns & Crain, Ltd.

(57) ABSTRACT

A propulsion system comprising a nacelle substantially tubular around a longitudinal axis, having an inner wall extending from a front to a rear of the nacelle and by an outer wall, external of the inner wall, extending from the front to the rear of the nacelle, a turbojet comprising a fan and situated internally of the inner wall of the nacelle, at least one tank containing an extinguishing fluid, and a network of pipes hydraulically connected to the tank. The propulsion system comprises each tank being located in the nacelle, around the inner wall and internally of the outer wall. Such a propulsion system makes it possible to shift the one or more tanks, which no longer occupy the space at the mast,

(Continued)

and makes it possible to carry a large volume of extinguishing fluid so as to be able to accommodate future regulations.

21 Claims, 9 Drawing Sheets

(51) Int. Cl.
*F01D 25/24* (2006.01)
*F02K 3/06* (2006.01)

AIRCRAFT PROPULSION SYSTEM HAVING AT LEAST ONE ANTI-FIRE TANK

CROSS-REFERENCES TO RELATED APPLICATIONS

This application claims the benefit of the French patent application No. 1559380 filed on Oct. 2, 2015, the entire disclosures of which are incorporated herein by way of reference.

TECHNICAL FIELD

The present invention relates to an aircraft propulsion system having at least one anti-fire tank, and to an aircraft having at least one such propulsion system.

BACKGROUND OF THE INVENTION

An aircraft conventionally has at least one propulsion system, comprising a nacelle inside which there is disposed an engine, for example of the turbojet type, and which is fixed to the structure of the aircraft by way of a mast fixed beneath the wing of the aircraft.

In order to prevent damage to the structure of the aircraft when an engine catches fire, the aircraft conventionally has, for each nacelle, two tanks containing an extinguishing fluid, which can be a liquid or gaseous agent.

Figure 1:
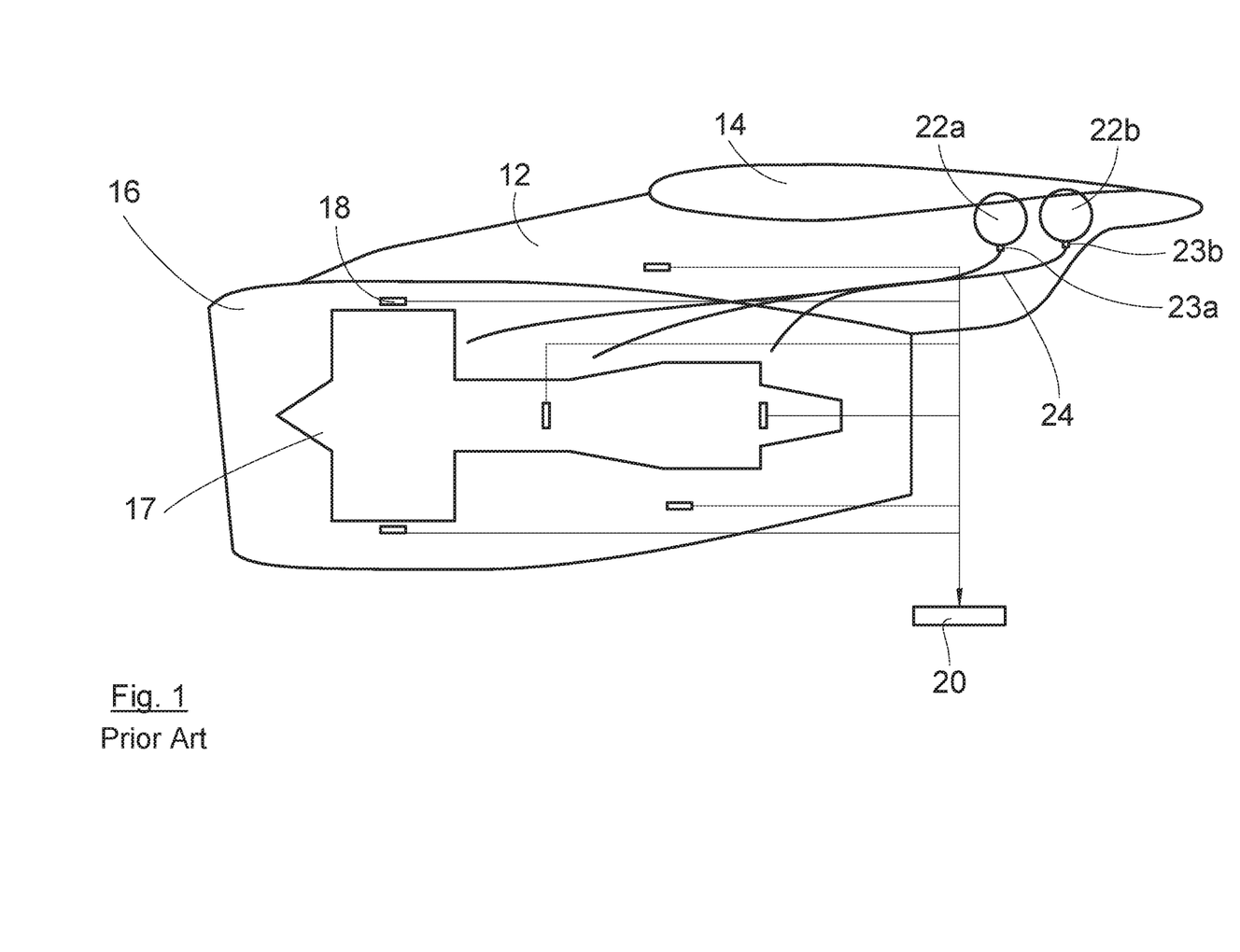
FIG. 1 is a schematic side view of a propulsion system of the prior art.

FIG. 1 is a schematic illustration of a prior art propulsion system, comprising a nacelle 16 and an engine 17 disposed inside the nacelle 16. This nacelle 16 is fixed beneath the mast 12 extending beneath the wing 14 of the aircraft.

In order to detect the onset of a fire in the propulsion system, the system is provided with a plurality of fire sensors 18, which are distributed within the propulsion system and which are connected to a detection unit 20.

For each propulsion system, the aircraft carries two tanks 22a and 22b, generally spherical in shape, which are fixed to the mast 12, are provided with explosive cartridges 23a-b, and are filled with an extinguishing fluid.

A network of pipes 24 extends between each tank 22a-b and different zones of the propulsion system.

When a fire sensor 18 detects a fire in the propulsion system, it informs the fire detection unit 20, which triggers a warning means present in the cockpit. The pilot then actuates an activation button, which actuates the explosion of one of the explosive cartridges 23a-b so as to release the extinguishing fluid from the associated tank 22a-b, the fluid then permeating the propulsion system through the network of pipes 24.

An anti-fire system of this type is fully satisfactory, but the extinguishing fluid used is generally based on bromotrifluoromethane, also referred to as "halon." Because this product is a relatively polluting product, it is being phased out and replaced increasingly by other products. These new products require tanks that have greater holding capacities, and these increases are not always compatible with the space available at the mast, which is already a relatively crowded zone.

SUMMARY OF THE INVENTION

An object of the present invention is to provide an aircraft propulsion system having at least one anti-fire tank, which system does not possess the disadvantages of the prior art and of which the tanks, in particular, have a greater holding capacity without further crowding the space available at the mast.

To this end, a propulsion system is provided which comprises:
- a nacelle which is substantially tubular around a longitudinal axis defined by an inner wall extending from the front of the nacelle to the rear of the nacelle and by an outer wall, externally of the inner wall, extending from the front of the nacelle to the rear of the nacelle,
- a turbojet having a fan and located internally of the inner wall of the nacelle,
- at least one tank containing an extinguishing fluid, and
- a network of pipes hydraulically connected to the or to each tank,
- the propulsion system being characterized in that each tank is placed in the nacelle, around the inner wall and internally of the outer wall.

Thus, with a propulsion system of this type, the extinguishing fluid tank or tanks is/are housed in the nacelle and do not crowd the space at the mast and make it possible to carry a large volume of extinguishing fluid. In addition, it advantageously allows the tank or tanks to be close to the zones that are to be protected so as to limit the length of the pipes and therefore the volume of the pipes and of the tanks.

In accordance with a particular embodiment, each tank is in a form having at least one circular section in a plane perpendicular to the longitudinal axis.

Each tank advantageously is in a form having at least one open torus portion in a plane perpendicular to the longitudinal axis.

In accordance with another particular embodiment, each tank is of a form having at least two cylinder portions not aligned.

Each tank advantageously extends angularly around the periphery of the nacelle so that the lower part of the or of each tank is above a horizontal plane tangent to the lower edge of the inner wall of the nacelle.

The tank or at least one of the tanks is advantageously situated in the portion of the nacelle extending in front of the fan of the turbojet.

The tank or at least one of the tanks is advantageously situated in the portion of the nacelle surrounding the fan of the turbojet.

In accordance with a particular embodiment, the connection between each tank and the network of pipes is situated in the lower part of the tank.

In accordance with another particular embodiment, each tank has a membrane separating the inner volume of the tank into a top part and a bottom part, the bottom part containing a pressurized gas, the top part containing the extinguishing fluid, and the connection between the tank and the network of pipes being situated in the top part of the tank.

In accordance with a particular embodiment, the propulsion system has a plurality of fasteners distributed along each tank and assuring the fixing of the tank to the inner wall of the nacelle.

In accordance with another particular embodiment, the propulsion system has a plurality of fasteners distributed along each tank and assuring the fixing of the tank to an intermediate wall extending around the engine between the inner wall and the outer wall of the nacelle.

The fasteners advantageously have a flexible or deformable element.

The invention also proposes an aircraft having at least one propulsion system according to one of the above variants.

BRIEF DESCRIPTION OF THE DRAWINGS

The features of the invention mentioned above as well as further features will become clearer upon reading the following description of an exemplary embodiment, the description being provided with reference to the accompanying drawings, in which.

In the following description, the terms relating to a position are to be understood with reference to an aircraft in a normal flight position.

DETAILED DESCRIPTION OF THE PREFERRED EMBODIMENTS

Figure 2:
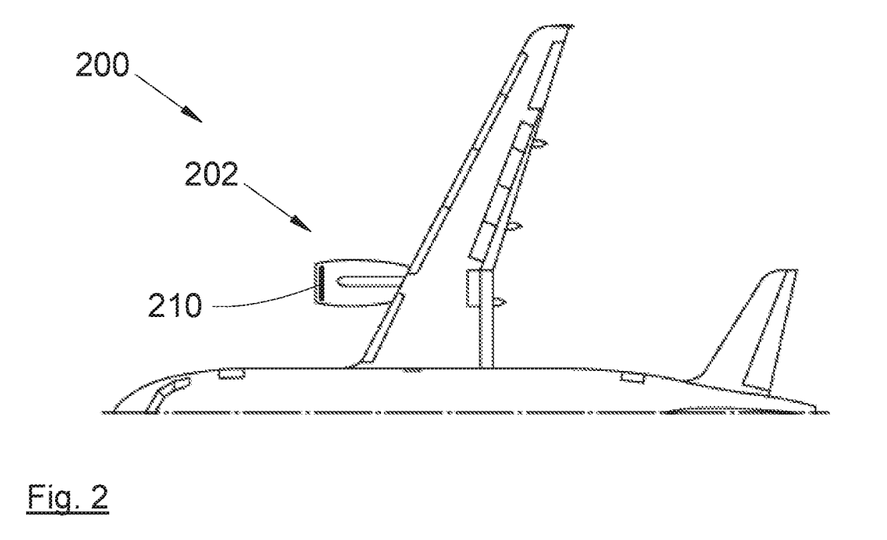
FIG. 2 is a schematic plan view of an aircraft according to the invention.

FIG. 2 shows an aircraft 200 which has at least one propulsion system 202. Each propulsion system 202 has at least one nacelle surrounding an engine and at least one tank 210 filled with an extinguishing fluid. The following description is given for a single propulsion system, but applies to all the propulsion systems of the aircraft 200, regardless of the number of propulsion systems possessed by the aircraft 200.

Figure 3:
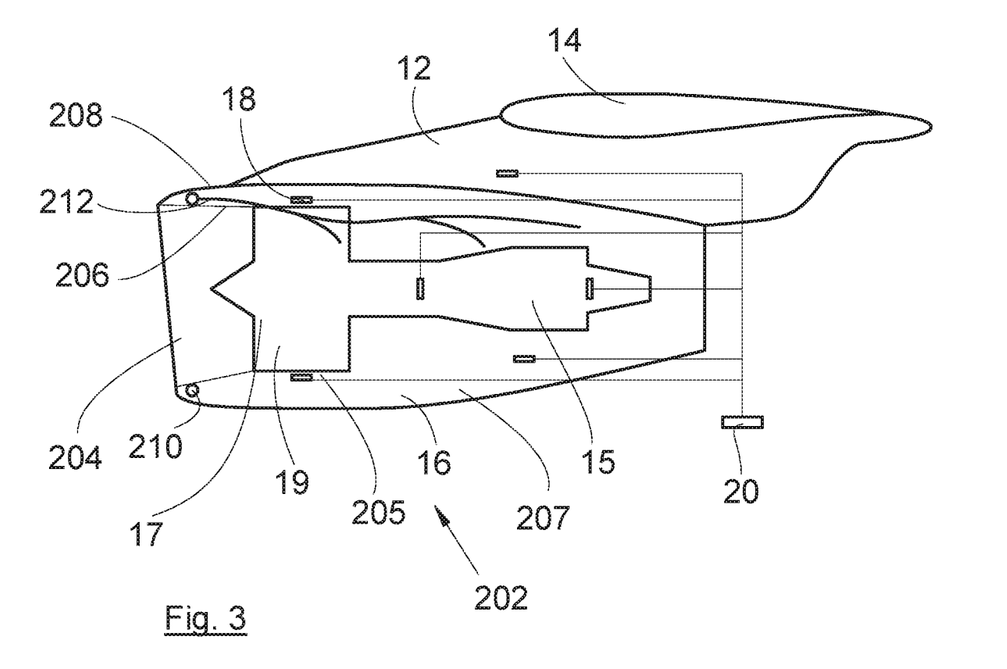
FIG. 3 is a schematic side view of a propulsion system according to the invention.

FIG. 3 shows the propulsion system 202 in a side view, the system containing an engine 17 surrounded by a nacelle 16. The engine 17 is a turbojet comprising a fan 19 placed in front of the body 15 of the engine, this body 15 comprising the compressor, the combustion chamber, and the turbine. The nacelle 16 surrounding and carrying this engine 17, in particular, comprises an air inlet 204, formed by the portion of the nacelle 16 which is in front of the fan 19, a fan casing 205 surrounding the fan 19 of the engine, and a thrust reverser 207 formed by the portion of the nacelle which is to the rear of the fan 19.

The nacelle 16 has a generally cylindrical form around its longitudinal axis. The generally cylindrical form is disposed between an inner wall 206, assuming the approximate form of a cylinder, and an outer wall 208, assuming the approximate form of a cylinder disposed externally of the inner wall 206. The inner wall 206 and the outer wall 208 extend from the front to the rear of the nacelle 16 and come together at the front of the nacelle 16 so as to form the leading edge of the nacelle and at the rear of the nacelle 16 so as to form the trailing edge of the nacelle 16. The nacelle 16 thus has a substantially tubular general form around its longitudinal axis. In the present description the fan casing, which is part of the engine, is considered to form part of the inner wall 206 defining the nacelle 16, at the point at which the fan 205 is surrounded.

The propulsion system 202 also has a plurality of fire sensors 18 distributed within the propulsion system 202 and connected to a detection unit 20. Similarly to the prior art, the propulsion system 202 is fixed to the structure of the aircraft 200 by way of a mast 12 fixed beneath the wing 14 of the aircraft 200. The triggering of the fire alarm is identical to that in the prior art. Similarly, the triggering by a pilot of the response to this fire alarm is identical to that in the prior art, that is to say, the actuation of an activation button actuates the explosion of an explosive cartridge so as to allow the extinguishing fluid contained in the tank 210 to circulate within a network of pipes 212 so as to permeate different points of the propulsion system 202.

Each tank 210 is fixed in the nacelle 16 of the propulsion system 202, between the inner wall 206 and the outer wall 208 of this nacelle 16. This positioning of the tanks 210 makes it possible to free space in the mast 12. It also allows a significant reduction of the length of the network of pipes 212, which makes it possible to reduce the mass of these pipes and to reduce the volume of extinguishing fluid which remains in these pipes and which is not used to extinguish a fire, and thus makes it possible to optimize the volume of the tanks while providing the same level of efficacy.

Figure 4:
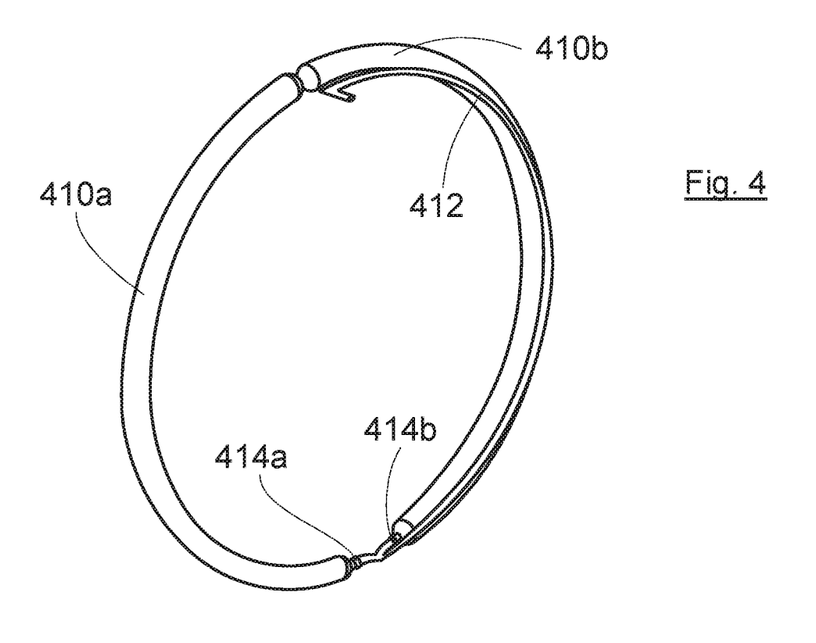
FIG. 4 is a perspective view of a pair of tanks in accordance with a first embodiment of the invention.

In a first embodiment shown in FIG. 4, there are two tanks 410a-b, which are intended to be placed in the nacelle 16. Each tank 410a-b assumes the form of an open torus portion in a plane substantially perpendicular to the longitudinal axis of the nacelle 16 so as to adapt to the form of the nacelle 16, and is filled with an extinguishing fluid.

Each tank 410a-b is hydraulically connected to an evacuation pipe system 412 forming part of the network of pipes 212 and thus allowing the supply of extinguishing fluid to the network. In the embodiment of the invention presented here, the majority of the evacuation pipe system 412 is common to the two tanks 410a-b.

Between each tank 410a-b and the evacuation pipe system 412, there is arranged a valve 414a-b, for example of the explosive cartridge type, which, when activated by a pilot, allows the release of the extinguishing fluid from the associated tank 410a-b to the network of pipes 212.

In the embodiment of the invention of FIG. 4, each tank 410a-b extends over a portion of the periphery of the inner wall 206 representing an angular zone of approximately 180°.

Figure 5:
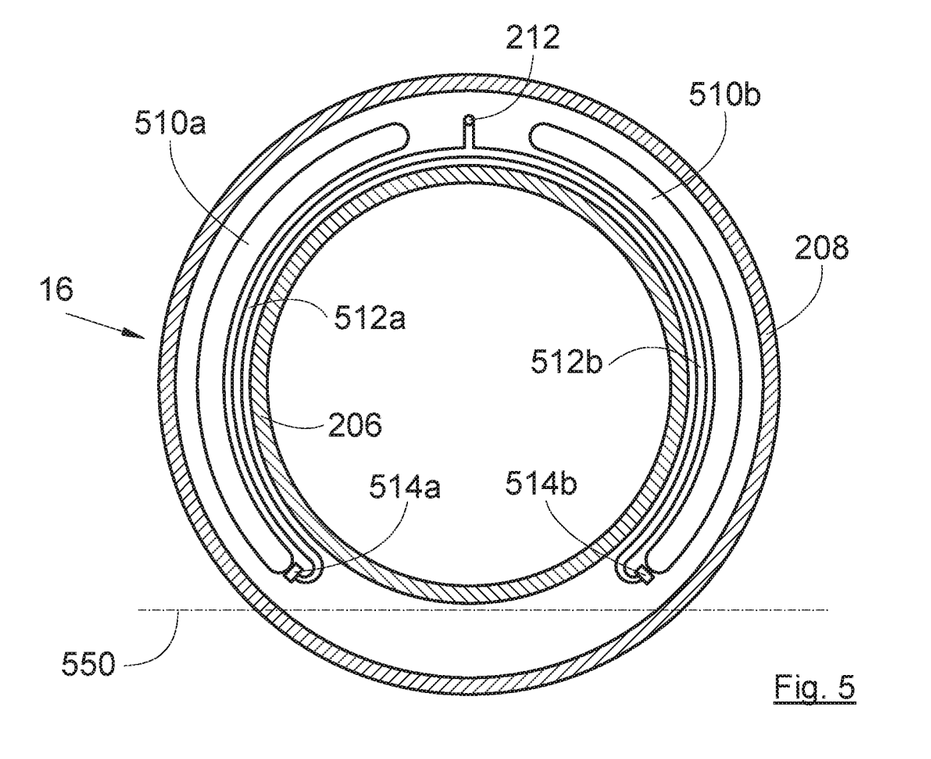
FIG. 5 is a front view of a pair of tanks installed in a nacelle according to a second embodiment of the invention.

In a second embodiment of the invention shown in FIG. 5, there are also two tanks 510a-b placed in the nacelle 16. Each tank 510a-b assumes the form of an open torus portion so as to adapt to the form of the nacelle 16 and is filled with an extinguishing fluid. Each tank 510a-b is hydraulically connected to an evacuation pipe system 512*a-b* forming part of the network of pipes 212 and thus allowing the supply of extinguishing fluid to the network. In the embodiment of the invention presented here, there is an evacuation pipe system 512*a-b* per tank 510*a-b*.

Between each tank 510*a-b* and the associated evacuation pipe system 512*a-b* there is arranged a valve 514*a-b*, for example of the explosive cartridge type, which, when activated by a pilot, allows the release of the extinguishing fluid from the associated tank 510*a-b* to the network of pipes 212.

In the embodiment of the invention of FIG. 5, each tank 510*a-b* extends angularly so that the lower part of each tank 510*a-b* is above a safety plane 550, which is a horizontal plane tangent to the lower edge of the inner wall 206 of the nacelle surrounding the fan blades 19, forming the fan casing. In effect, the nacelle 16 is normally dimensioned so that the portion of the nacelle 16 situated above this plane is not subject to any major damage in the event that the aircraft 200 lands with the landing gear retracted. Thus, even in the case that the aircraft lands with the landing gear retracted, the tanks 510*a-b* remain intact and can be used. Here, each tank 510*a-b* extends over a portion of the perimeter of the nacelle representing an angular zone of approximately 120°.

In the embodiments presented here, there are in each case two tanks assuming the form of an open torus portion, but generally there can be at least one tank in the form of an open torus portion fixed in the nacelle 16 around the inner wall 206 and internally of the outer wall 208.

Similarly, in the embodiments presented here, the two tori are co-planar, but could number more than two and could be in different planes and thus could be disposed one behind the other around the inner wall 206 and could each have an angular amplitude greater than 180°, further increasing the volume of the available extinguishing fluid.

The angular amplitude of each tank 210, 410*a-b*, 510*a-b* varies depending on the congestion around the tank 210, 410*a-b*, 510*a-b* and can be up to 360°. A large angular amplitude allows a relatively uniform distribution of the weight and rigidity around the engine 17.

Each tank 210, 410*a-b*, 510*a-b* preferably extends over an angular zone of at least 90° so that it contains a minimal quantity of extinguishing fluid while adapting to the space available in the nacelle 16.

Figure 6:
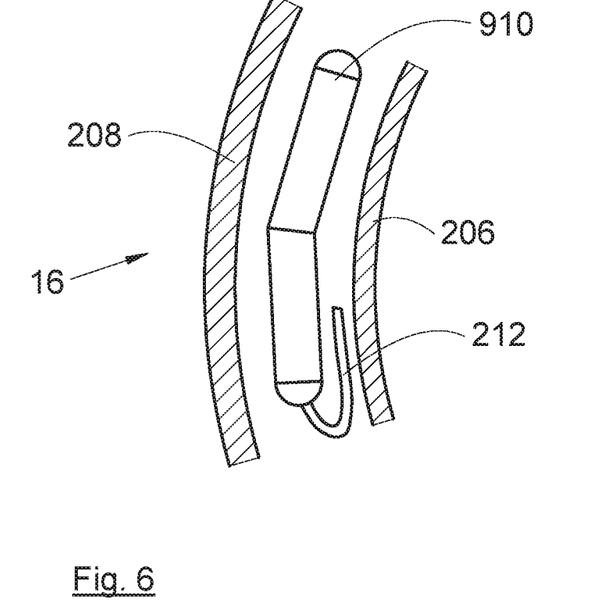
FIG. 6 is a front view of a tank according to a third embodiment of the invention.

In the preferred embodiments shown in FIGS. 4 and 5, the tanks 410*a-b* and 510*a-b* are in the form of open torus portions. Such a form allows the tanks to adapt well to the form of the nacelle 16. However, it is also possible that the tanks are of other forms suitable for being contained in the nacelle 16. Thus, FIG. 6 shows part of a nacelle 16 in which a tank 910 is placed around the inner wall 206 and internally of the outer wall 208. This tank 910 has a form provided by assembled cylinder portions forming therebetween angles allowing the tank 910 to adapt to the form of the nacelle 16. The tank 910 presented in FIG. 6 has two assembled cylinder portions, but it is also possible to assemble a greater number of portions.

Figure 7:
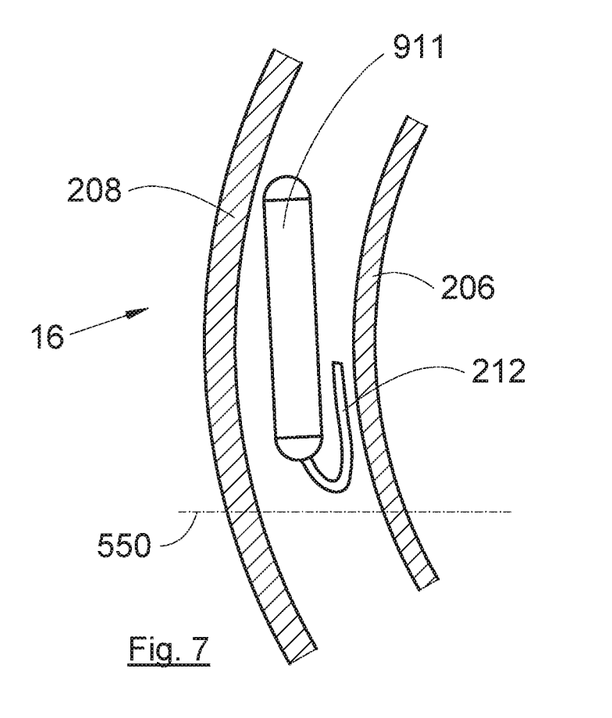
FIG. 7 is a front view of a tank according to a fourth embodiment of the invention.

Likewise, FIG. 7 shows a part of a nacelle 16 in which a tank 911 is placed around the inner wall 206 and internally of the outer wall 208. This tank 911 has a cylindrical form. In this embodiment, the length of the tank 911 is limited so as to allow it to be accommodated in the nacelle 16. In the embodiments shown by FIGS. 6 and 7, the tanks 910 and 911 are connected to the network of pipes 212 in a manner similar to the embodiments in FIGS. 4 and 5, and this will not be described here in greater detail.

Further tank forms suitable for a nacelle can also be envisaged by a person skilled in the art. However, the tank forms having a circular section in a plane substantially perpendicular to the longitudinal axis of the nacelle 16 are preferred because they allow a greater resistance to pressure. Among these forms, the tank forms having at least one open torus portion in a plane substantially perpendicular to the longitudinal axis of the nacelle 16 are preferred because they allow a better adaptation of the tank to the form of the air inlet and can thus allow a greater usable volume of the tank with a limited overall size.

The extinguishing fluid is generally combined with a pressurized gas also present in each tank 210, 410*a-b*, 510*a-b*, 910, 911. Insofar as the gas is lighter than the extinguishing fluid, it is positioned in the top part of each tank 210, 410*a-b*, 510*a-b*, 910, 911. So as to allow the flow of the extinguishing fluid, the connection between the tank 210, 410*a-b*, 510*a-b*, 910, 911 and the network of pipes 212 by way of the evacuation pipe system 412, 512*a-b* is situated in the lower part of the tank 210, 410*a-b*, 510*a-b*, 910, 911.

In another embodiment of the invention, the tank 210, 410*a-b*, 510*a-b*, 910, 911 has a membrane separating the inner volume of the tank 210, 410*a-b*, 510*a-b*, 910, 911 into a top part and a bottom part. In this case, the pressurized gas can be held in the bottom part of the tank 210, 410*a-b*, 510*a-b*, 910, 911 and the extinguishing fluid can be held in the top part. The connection between the tank 210, 410*a-b*, 510*a-b*, 910, 911 and the network of pipes 212 by way of the evacuation pipe system 412, 512*a-b* is then situated in the upper part of the tank 210, 410*a-b*, 510*a-b*, 910, 911.

In an advantageous embodiment, the tank or tanks is/are situated in the portion of the nacelle 16 forming the air inlet 204, in front of the fan 19. The tanks are in this case in a zone which, because it is in front of the engine, is well protected in the event of a fire in the engine, and which is at low risk of becoming damaged in the event of a breakage of a blade of the fan 19. In other possible embodiments, the tank or tanks can be situated in the portion of the nacelle 16 forming the casing of the fan 19.

Figure 8:
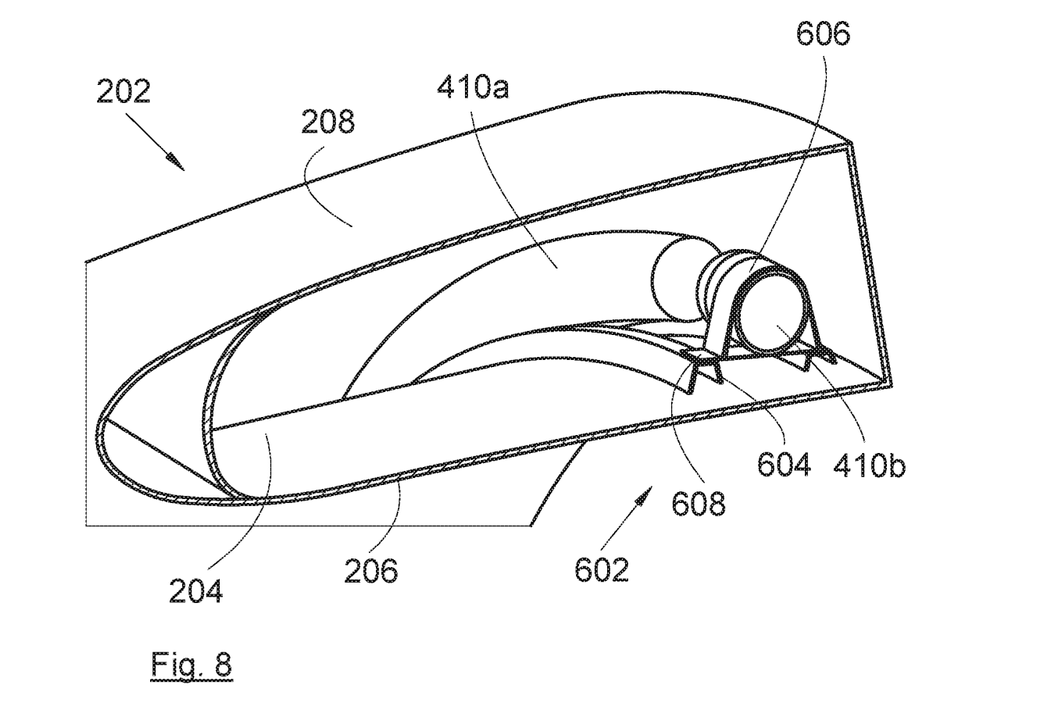
FIG. 8 is a perspective view of a first embodiment for fixing a tank to the nacelle.

FIG. 8 shows a first embodiment for fixing the tanks 410*a-b* in the air inlet 204 of a nacelle. Although FIG. 8 is applied to the tanks 410*a-b* according to the first embodiment, it can apply to all types of tanks according to the invention.

The fixing of each tank 410*a-b* to the inner wall 206 is assured by a plurality of fasteners 602, just one of which is shown in FIG. 8, and which are distributed along each tank 410*a-b*. Each fastener 602 assumes the form of a clamp 606 which encloses the tank 410*a-b* and which has a foot 608 fixed to the inner wall 206, here by way of bridge connectors 604.

Within the scope of maintenance, the tanks 410*a-b* can be accessed, for example, by local disassembly of the outer wall 208.

Figure 9:
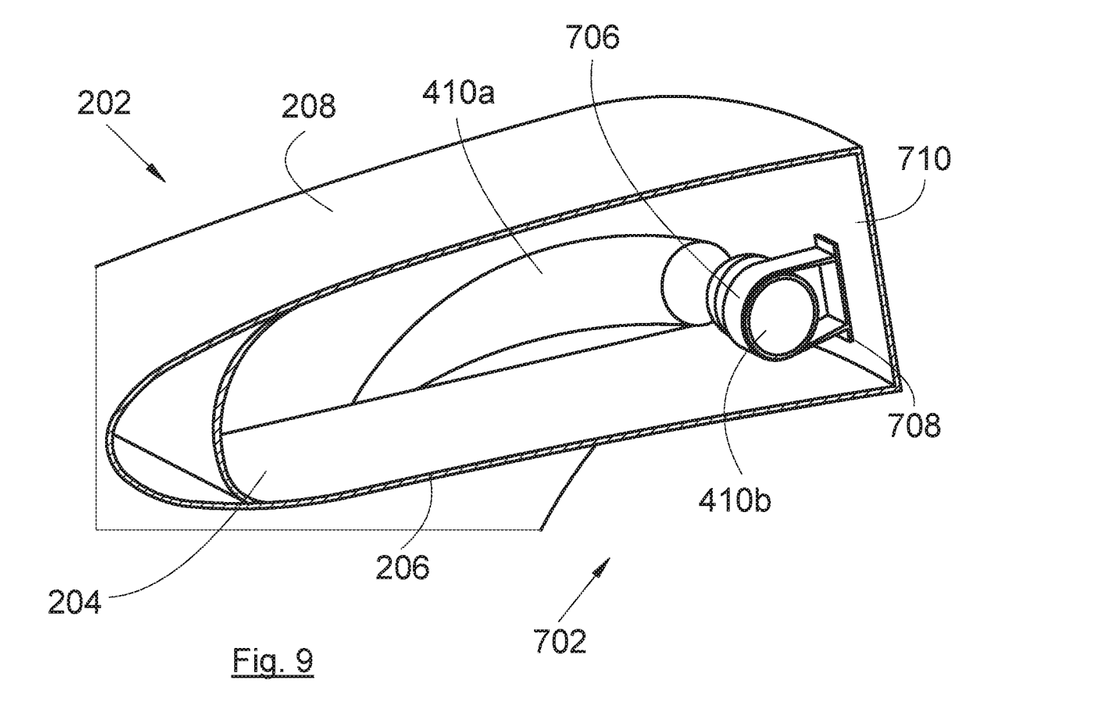
FIG. 9 is a perspective view of a second embodiment for fixing a tank to the nacelle.

FIG. 9 shows a second embodiment for fixing the tanks 410*a-b* in the air inlet 204 of a nacelle. Although FIG. 9 is applied to the tanks 410*a-b* according to the first embodiment, it can be applied to all types of tanks according to the invention.

The fixing of each tank 410*a-b* is assured by a plurality of fasteners 702, of which just one is shown in FIG. 9, and which are distributed along the tank 410*a-b*. Each fastener 702 assures the fixing of the tank 410*a-b* to an intermediate wall 710 extending around the engine 17 between the inner wall 206 and the outer wall 208. Each fastener 702 assumes the form of a clamp 706 which encloses the tank 410*a-b* and which has a foot 708 fixed to the intermediate wall 710.

It should be noted that the intermediate wall 710 can extend in a plane perpendicular to the axis of the engine, or can be inclined relative to this plane. This intermediate wall 710 can also have various forms, for example can be in the form of a truncated cone.

Within the scope of maintenance, the tanks 410a-b can be accessed for example by disassembly of part of the outer wall 208.

Such an arrangement of the tanks 410a-b also allows these tanks 410a-b to form a reinforcement of the structure surrounding the engine 17 and contributing to the rigidity of the nacelle 16, for example in the event of rupture of a blade of the fan.

So as to allow the tanks 410a-b to withstand the deformations of the nacelle 16, the fasteners 602, 702 can advantageously incorporate a flexible element, such as a rubber or deformable block, which is able to absorb some of the energy of a deformation of the nacelle 16.

FIGS. 10, 11, 12 and 13 show variants of the fixing embodiments shown by FIGS. 6 and 7, which allow different distributions of the mechanical forces experienced by the nacelle 16. These variants can apply to all types of tanks according to the invention.

Figure 10:
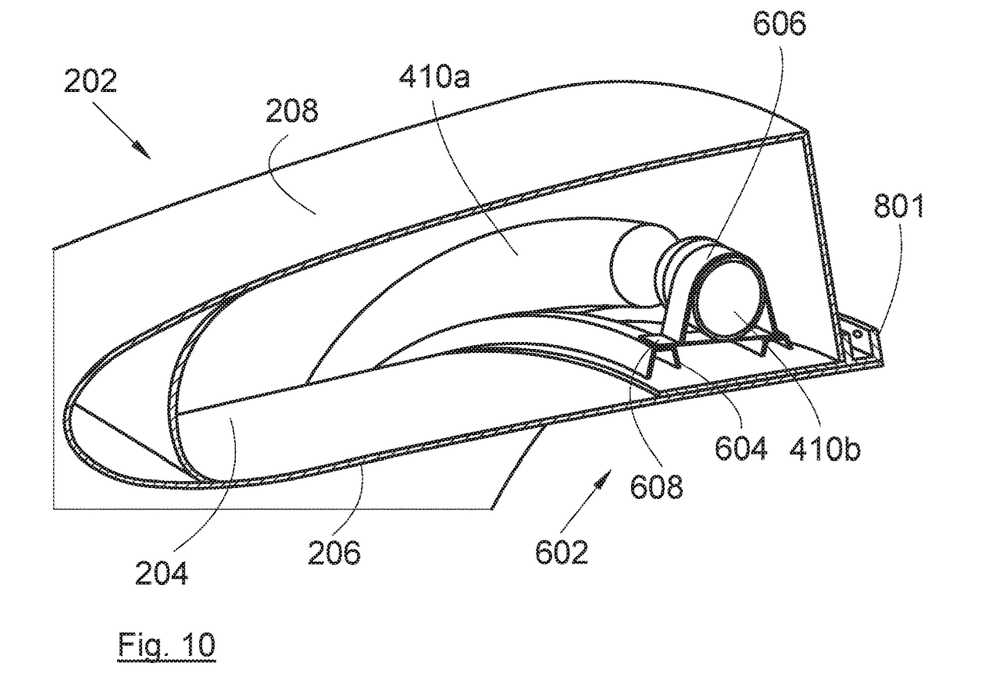
FIG. 10 is a perspective view of a variant of the first embodiment for fixing a tank to the nacelle.

Thus, FIG. 10 shows a variant of the fixing mode shown by FIG. 8, in which the bridge connectors 604 which support the feet 608 of the fasteners 602 are fixed to a support 801 extending along the inner wall 206. This support 801 comprises a cylindrical portion which carries the bridge connectors 604 and a portion forming a U-shaped annular profile which can be directly connected to the fan casing (not shown in FIG. 10) by way of a releasable connection.

Figure 11:
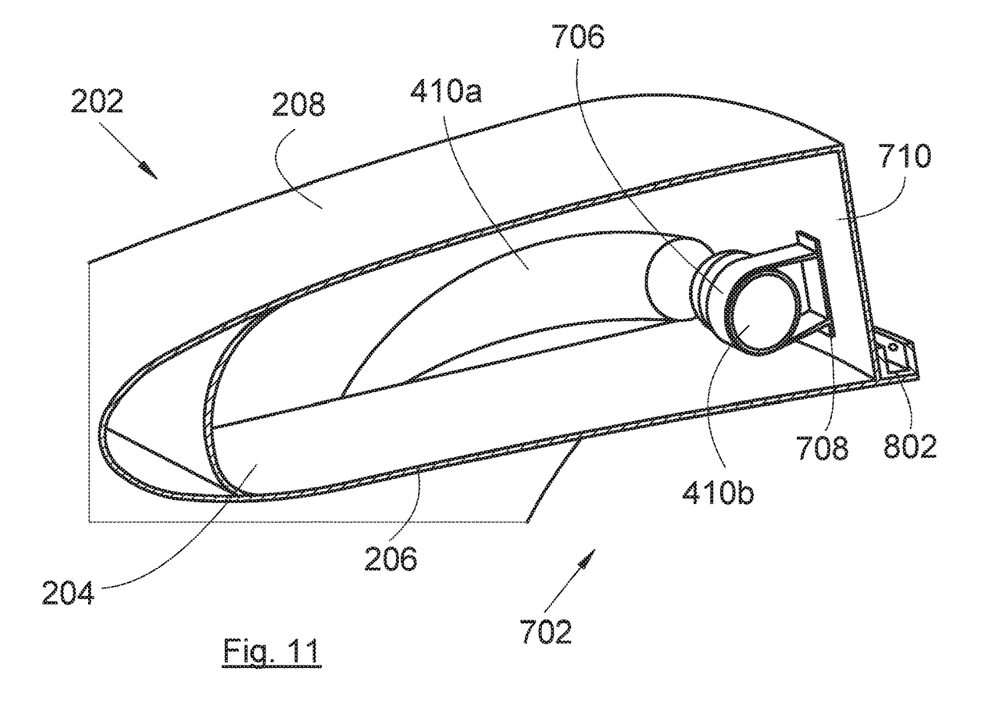
FIG. 11 is a perspective view of a variant of the second embodiment for fixing a tank to the nacelle.

FIG. 11 shows a variant of the fixing embodiment shown by FIG. 9, in which the intermediate partition 710 which supports the feet 708 of the fasteners 702 is assembled on the inner wall 206 by way of a U-shaped annular profile 802, which can be directly connected to the fan casing (not shown in FIG. 11) and/or to the engine by way of a releasable connection.

Figure 12:
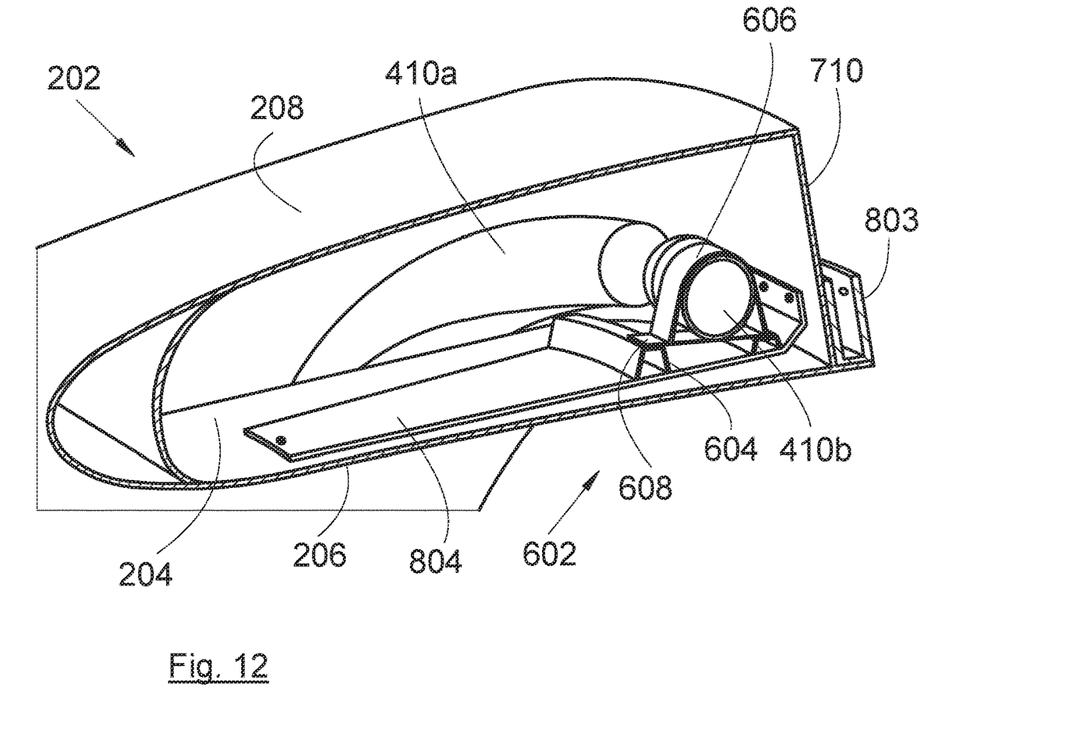
FIG. 12 is a perspective view of another variant of the first embodiment for fixing a tank to the nacelle.

FIG. 12 shows another variant of the fixing embodiment shown by FIG. 8, in which the feet 608 of each fastener 602 are fixed to short bridge connectors 604, which are in turn fixed to a support 804. Each support 804 extends substantially parallel to the axis of the engine and parallel to the inner wall 206 and is fixed, at its front end, to a portion of the inner wall 206 close to the leading edge of the nacelle 16, and, at its rear end, to the intermediate partition 710 and, through the partition 710, to a U-shaped annular profile 803, which can be directly connected to the fan casing (not shown in FIG. 12) by way of a releasable connection.

Figure 13:
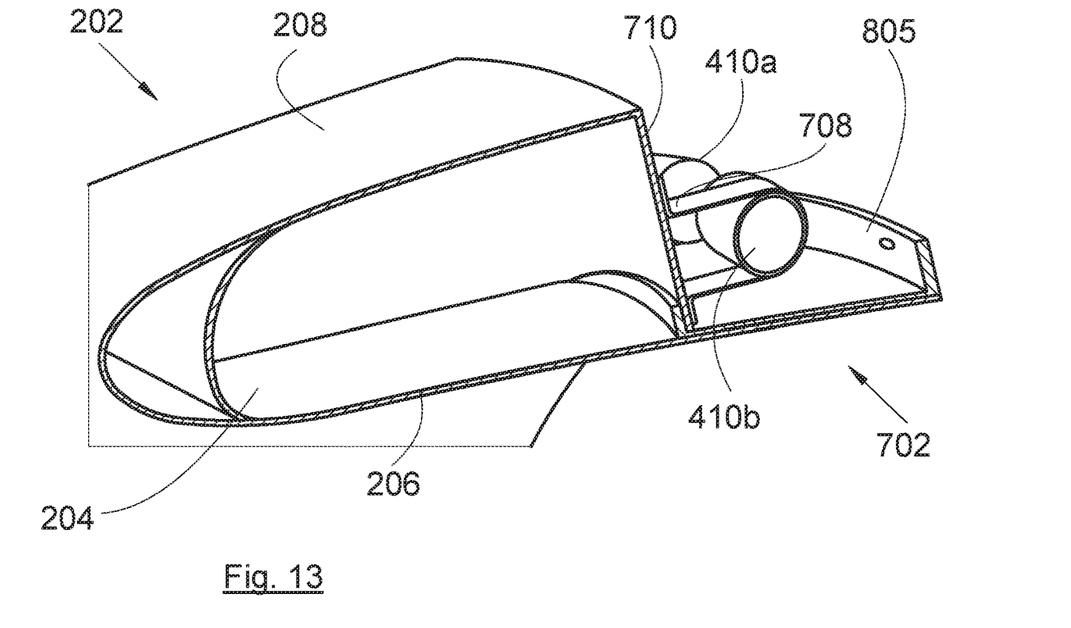
FIG. 13 is a perspective view of a third embodiment for fixing a tank to the nacelle.

FIG. 13 shows a further variant of the fixing embodiment shown by FIG. 9, in which the feet 708 of the fasteners 702 are assembled on the rear face of the intermediate partition 710, which is inclined and has the form of a truncated cone. This intermediate partition 710 is assembled on the inner wall 206 by way of a support 805, which can be directly connected to the fan casing (not shown in FIG. 13) and/or to the engine by way of a releasable connection. In the case in which the tanks are installed in a zone likely to be exposed to fire, the tanks can be covered by an additional wall forming a screen so as to avoid exposing the tanks to high temperatures.

Figure 14:
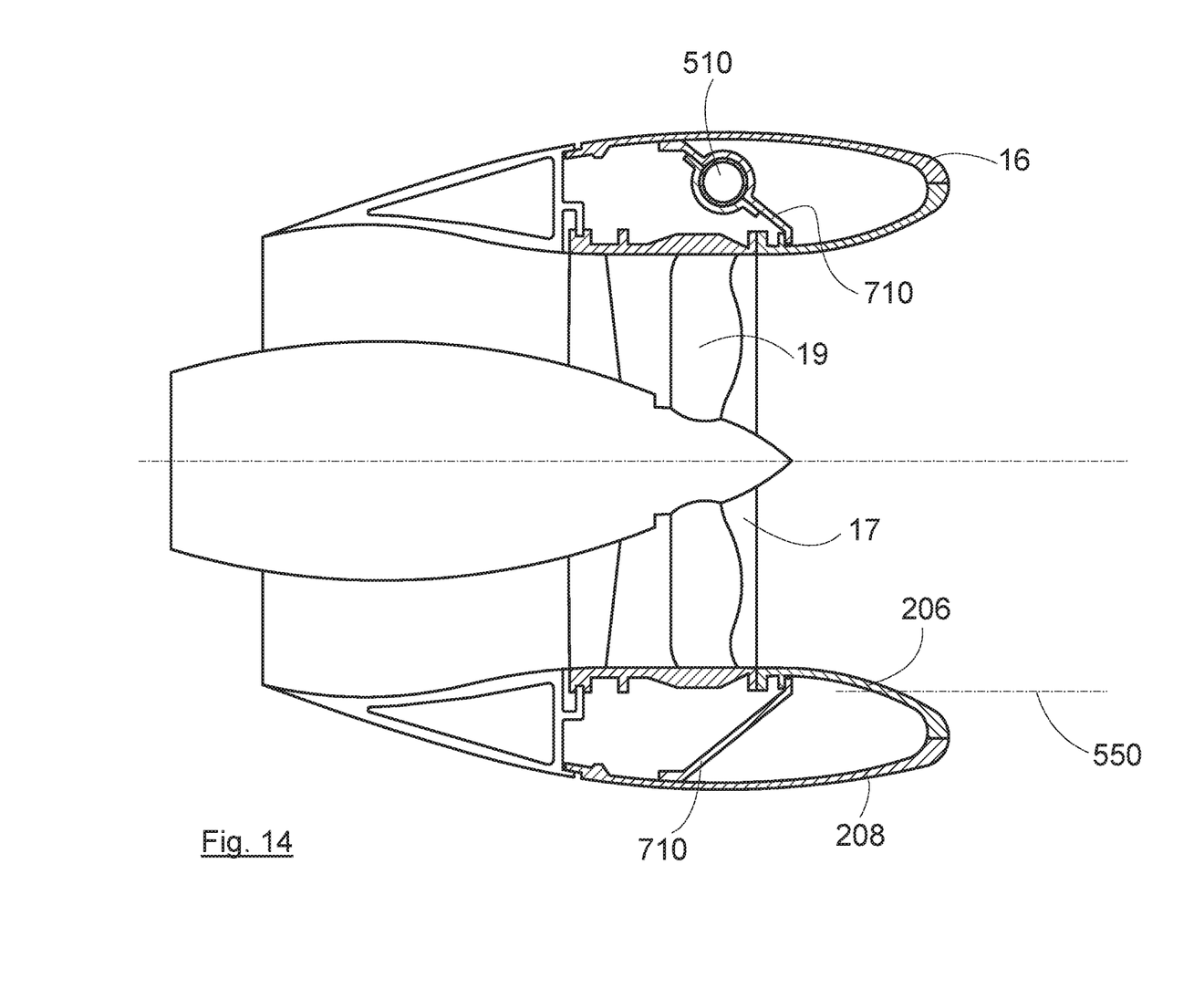
FIG. 14 is a schematic view, along a longitudinal section, of a propulsion system in which tanks are fixed to the nacelle according to a fourth fixing embodiment.

FIG. 14 shows another embodiment of a nacelle 16 of an engine 17, the nacelle being suitable for an engine having very high bypass ratios. In this embodiment, the tanks 510 are situated in the portion of the nacelle 16 surrounding the fan 19, between the outer wall 208 and the inner wall 206 of the nacelle 16, and are carried by an intermediate wall 710 connecting this inner wall 206 and outer wall 208.

Figure 15:
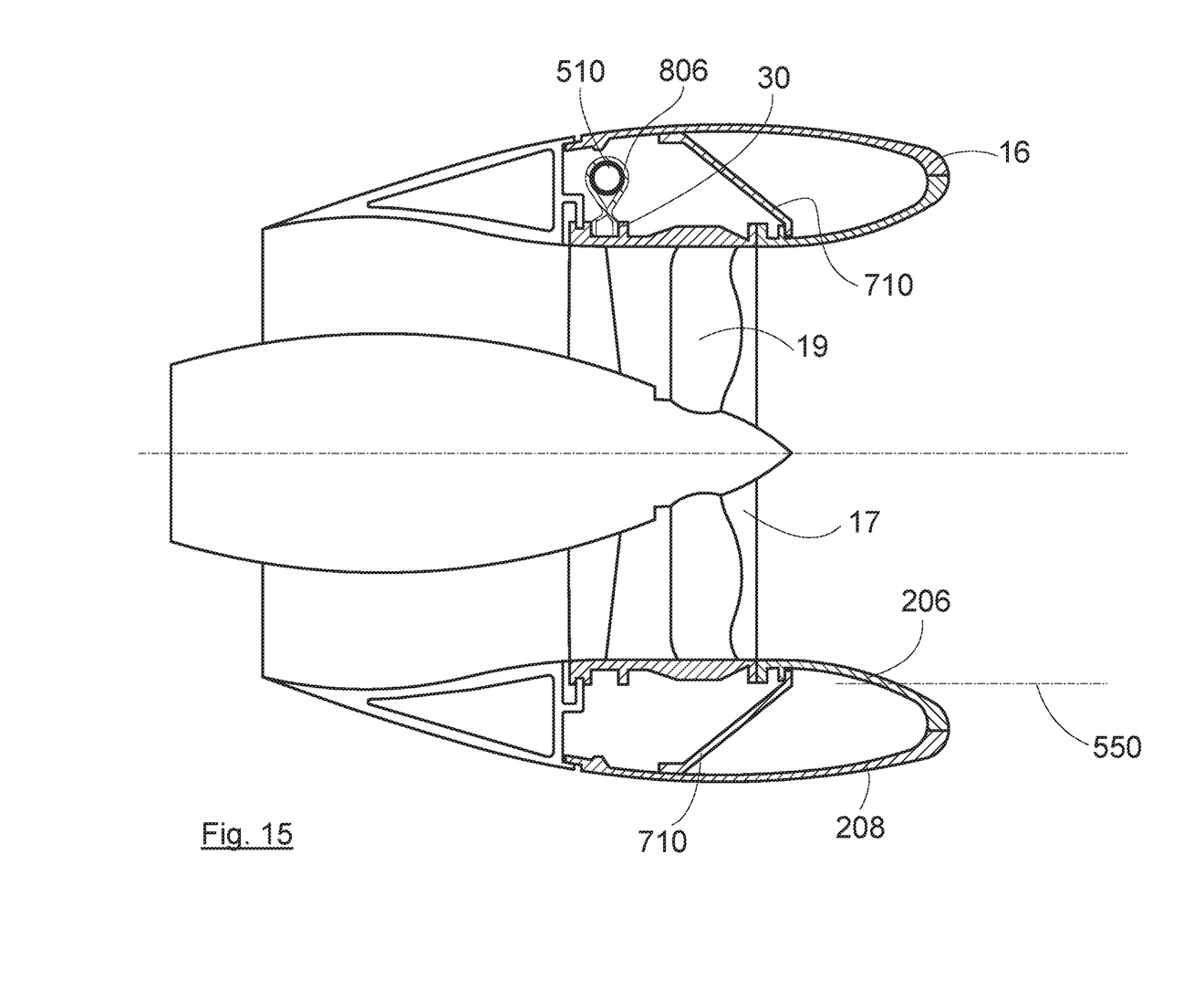
FIG. 15 is a schematic view, along a longitudinal section, of a propulsion system in which tanks are fixed to the nacelle according to a fifth fixing embodiment.

FIG. 15 shows yet another embodiment of a nacelle 16 of an engine 17, the nacelle being suitable for an engine having very high bypass ratios. In this embodiment, the tanks 510 are situated in the portion of the nacelle 16 surrounding the fan 19, between the outer wall 208 and the inner wall 206 of the nacelle 16, and are carried by a support 806 fixed to the fan casing 30, which forms the inner wall 206 of the nacelle in line with the fan 19.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system comprising:
    a nacelle which is substantially tubular around a longitudinal axis, defined by an inner wall extending from a front of the nacelle to a rear of the nacelle and by an outer wall, external of the inner wall, extending from the front of the nacelle to the rear of the nacelle,
    a turbojet comprising a fan and being situated internally of the inner wall of said nacelle,
    at least one tank containing an extinguishing fluid, being located inside said nacelle between the inner wall and the outer wall, and
    a network of pipes hydraulically connected to said at least one tank,
    wherein said at least one tank extends around the inner wall,
    wherein said at least one tank is of a form having at least one open torus portion in a plane perpendicular to the longitudinal axis,
    wherein said open torus portion extends around said inner wall following a shape of the inner wall.

2. The propulsion system according to claim 1, wherein said at least one tank extends angularly around the periphery of said nacelle so that a lower part of said at least one tank is above a horizontal plane tangent to a lower edge of said inner wall of said nacelle.

3. The propulsion system according to claim 1, wherein said at least one tank is situated in a portion of the nacelle extending in front of the fan of the turbojet.

4. The propulsion system according to claim 1, wherein said at least one tank is situated in a portion of the nacelle surrounding the fan of the turbojet.

5. The propulsion system according to claim 1, wherein a connection between said at least one tank and the network of pipes is situated in a lower part of said at least one tank.

6. The propulsion system according to claim 1, wherein said at least one tank has a membrane separating an interior volume of the at least one tank into a top part and a bottom part, and wherein the bottom part contains a pressurized gas, and wherein the top part contains the extinguishing fluid, and wherein a connection between said at least one tank and the network of pipes is situated in the top part of said at least one tank.

7. The propulsion system according to claim 1, wherein the propulsion system has a plurality of fasteners distributed along said at least one tank and assuring a fixing of said at least one tank to the inner wall of the nacelle.

8. The propulsion system according to claim 7, wherein the fasteners have a flexible or deformable element.

9. The propulsion system according to claim 1, wherein the propulsion system has a plurality of fasteners distributed along said at least one tank and assuring a fixing of said at least one tank to an intermediate wall extending around the turbojet between the inner wall and the outer wall of the nacelle.

10. The propulsion system according to claim 9, wherein the fasteners have a flexible or deformable element.

11. An aircraft having at least one propulsion system comprising:
- a nacelle which is substantially tubular around a longitudinal axis, defined by an inner wall extending from a front of the nacelle to a rear of the nacelle and by an outer wall, external of the inner wall, extending from the front of the nacelle to the rear of the nacelle,
- a turbojet comprising a fan and being situated internally of the inner wall of said nacelle,
- at least one tank containing an extinguishing fluid, being located inside said nacelle between the inner wall and the outer wall, and
- a network of pipes hydraulically connected to said at least one tank,
- wherein said at least one tank extends around the inner wall,
- wherein said at least one tank is of a form having at least one open torus portion in a plane perpendicular to the longitudinal axis,
- wherein said open torus portion extends around said inner wall following a shape of the inner wall.

12. The aircraft according to claim 11, wherein said at least one tank extends angularly around the periphery of said nacelle so that a lower part of said at least one tank is above a horizontal plane tangent to a lower edge of said inner wall of said nacelle.

13. The aircraft according to claim 11, wherein said at least one tank is situated in a portion of the nacelle extending in front of the fan of the turbojet.

14. The aircraft according to claim 11, wherein said at least one tank is situated in a portion of the nacelle surrounding the fan of the turbojet.

15. The aircraft according to claim 11, wherein a connection between said at least one tank and the network of pipes is situated in a lower part of said at least one tank.

16. The aircraft according to claim 11, wherein said at least one tank has a membrane separating an interior volume of the at least one tank into a top part and a bottom part, and wherein the bottom part contains a pressurized gas, and wherein the top part contains the extinguishing fluid, and wherein a connection between said at least one tank and the network of pipes is situated in the top part of said at least one tank.

17. The aircraft according to claim 11, wherein the propulsion system has a plurality of fasteners distributed along said at least one tank and assuring a fixing of said at least one tank to the inner wall of the nacelle.

18. The aircraft according to claim 17, wherein the fasteners have a flexible or deformable element.

19. The aircraft according to claim 1, wherein the propulsion system has a plurality of fasteners distributed along said at least one tank and assuring a fixing of said at least one tank to an intermediate wall extending around the turbojet between the inner wall and the outer wall of the nacelle.

20. The aircraft according to claim 19, wherein the fasteners have a flexible or deformable element.

21. A propulsion system comprising:
- a nacelle which is substantially tubular around a longitudinal axis, defined by an inner wall extending from a front of the nacelle to a rear of the nacelle and by an outer wall, external of the inner wall, extending from the front of the nacelle to the rear of the nacelle,
- a turbojet comprising a fan and being situated internally of the inner wall of said nacelle,
- at least one tank containing an extinguishing fluid, being located inside said nacelle between the inner wall and the outer wall, and
- a network of pipes hydraulically connected to said at least one tank,
- wherein said at least one tank extends around the inner wall,
- wherein said at least one tank is of a form having at least one open torus portion in a plane perpendicular to the longitudinal axis,
- wherein said open torus portion extends around said longitudinal axis following a shape of the inner wall.

* * * * *